INVENTOR.
LLOYD W. GOLDBERG 3,039,482
Patented June 19, 1962

3,039,482
OFFSET HERMETIC SEAL FOR BUTTERFLY TYPE VALVE
Lloyd W. Goldberg, Clifton, N.J., assignor to Thiokol Chemical Corporation, Bristol, Pa., a corporation of Delaware
Filed Jan. 17, 1961, Ser. No. 83,188
3 Claims. (Cl. 137—68)

This invention relates to valves in general and has particular reference to a butterfly type valve for application to a fluid supply pipe line in the operational use of which it is necessary initially to seal the valve hermetically in temporarily closed position and to provide means to seal it non-hermetically after the hermetic seal has been broken whenever the valve is again closed.

In butterfly valves of the kind just mentioned, it is customary to locate a wall-to-wall shearable sheet of frangible material in the valve body on the upstream side of the movable valve member to serve as the initially effective hermetic sealing means. As the secondary or non-hermetic sealing means, an elastic sealing ring is applied to the marginal edge of the movable valve member for sealing contact with an annular valve seat in the valve body.

Prior to my present invention, the arrangement of the pivotal axis of the movable butterfly valve member in relation to the longitudinal axis of the valve seat has been such that, when the valve eventually has been opened and the hermetic seal broken, there is a rough edge of the sheared sheet remaining contiguous to the valve seat in a position to rub against and damage the secondary non-hermetic sealing ring on the rim of the movable valve member during the initial valve opening operation and thereafter every time the valve is opened and closed.

It, therefore, is the primary object of my present invention to provide an offset arrangement of the shear-line of the hermetic sealing sheet in relation to the path of movement of the sealing ring on the semi-circular half-portion of the movable valve member which moves upstreamward beyond the valve seat such that the sealing ring will clear the rough sheared edge of the broken hermetic sealing sheet and thereby avoid undesirable abrasion.

Further objects, advantage and features of the invention will become apparent as the following specific description is read in connection with the accompanying drawing, in which.

Figure 1:
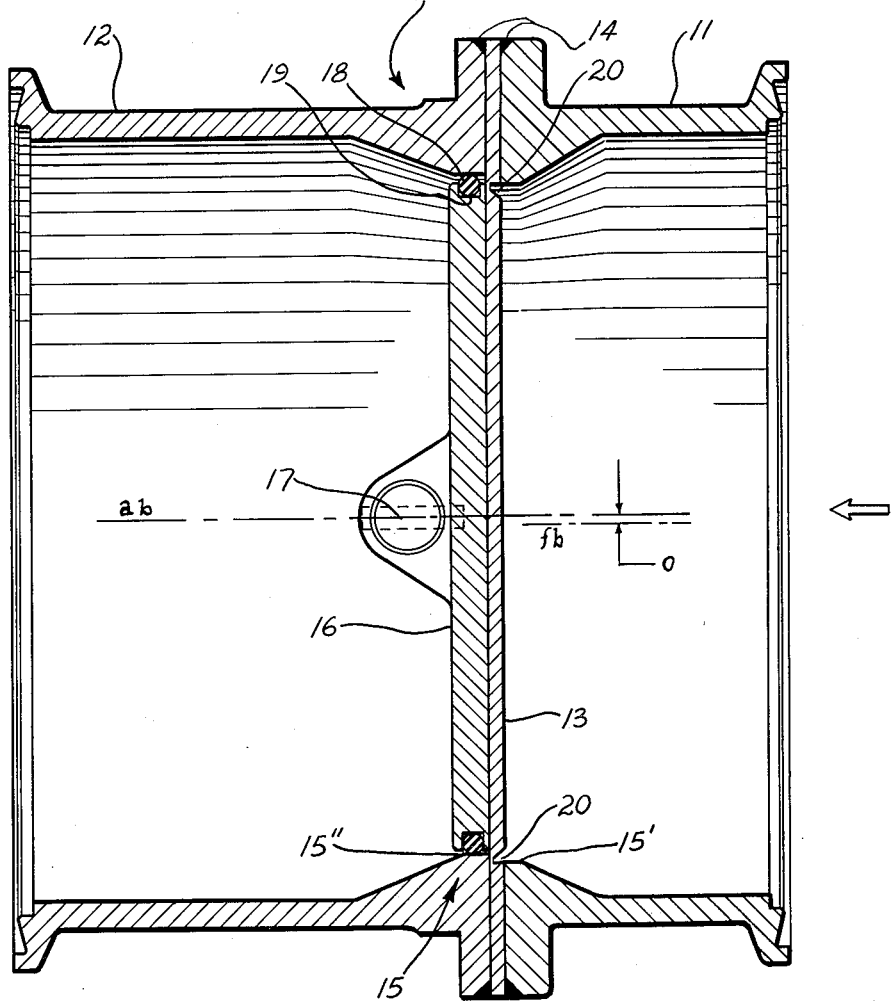
FIGURE 1 is a longitudinal vertical sectional view of a butterfly type valve constructed in accordance with the present invention, showing the valve closed and hermetically sealed.

Referring now in detail to the drawing, wherein like reference characters designate corresponding parts in the several views, it will be observed that the illustrative embodiment of my improved valve includes a hollow valve body 10 which is divided into two sections 11 and 12 in order that the marginal edge of a flat circular shearable sealing sheet 13 of frangible material may be held between them in wall-to-wall hermetically sealing relation by welding as at 14.

In relation to the direction of fluid flow, upstream valve body section 11 may be termed the "forward body section" and downstream valve body section 12 the "aft body section." Both valve body sections have substantially cylindrical lateral walls of equal inside diameter providing an interior fluid-conducting chamber.

The lateral walls of the respective body sections 11 and 12 are constricted at the adjacent ends thereof to form component half-portions 15′ and 15″ of an annular valve seat 15.

A butterfly type movable valve member 16 in the form of a flat circular disk is mounted for oscillation in aft body section 12 on a lateral axis which intersects the longitudinal axis of the said aft body section and is caused to adhere closely to shearable hermetic sealing sheet 13 by suitable means such as welding. In order that opening and closing torque may be applied to movable valve member 16 from outside valve body 10, the said movable valve member is affixed to a transverse shaft 17 journaled in the lateral wall of aft body section 12 on a lateral axis intersecting the longitudinal axis of said aft body section and with at least one end thereof projecting radially outward therefrom (not shown). An elastic sealing ring 18, such as an "O-ring," is partially recessed in a groove 19 provided in the rim of movable valve member 16 for non-hermetic sealing contact with half-portion 15″ of valve seat 15.

The upstreamward face of shearable hermetic sealing sheet 13 is scored on a circular shear-line substantially flush with half-portion 15′ of valve seat 15 to provide a notch 20 that nearly penetrates the thickness of said sheet 13 but not enough to affect its hermetic sealing effectiveness. Notch 20 is V-shaped in radial cross-section and arranged with its outer side wall at right angles to the plane of the sheet face and precisely flush with the radially inner face of the corresponding valve seat half-portion 15′.

The relative positions of the non-hermetic sealing ring on the movable valve member, the aft valve body section, the shearable hermetic sealing sheet, and the forward valve body section are critical. Instead of having the respective aft and forward valve body sections 12 and 11 in axial alignment, which is the prior art arrangement that resulted in abrading interference between the sealing ring on the movable valve member and the rough sheared edge of the hermetic sealing sheet when the valve is opened, my improvement consists in offsetting the longitudinal axis $ab$ of aft valve body section 12 slightly from the axis $fb$ of forward valve body section 11 in a direction at right angles to the pivotal axis of movable valve member 16 and also in a direction toward the semi-circular half-portion of said valve member whose movement is confined to the aft valve body section 12 to provide radial offset $o$. (FIG. 1.) In other words, in direct reference to the orientation of the structural parts in the drawing, the longitudinal axis of aft valve body section 12 is offset upwardly with respect to the longitudinal axis of forward valve body section 11 and in a direction at right angles to the horizontally arranged pivotal axis of movable valve member 16.

Figure 2:
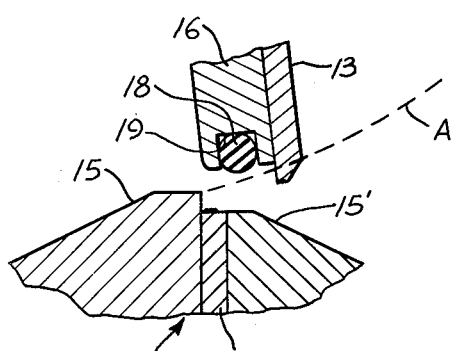
FIGURE 2 is a similar large-scale sectional view of the lower edge portion of the movable valve member and the valve seat alone, showing these parts after the valve has commenced to open.

In consequence of the critical dispositions just enumerated, when movable butterfly valve member 16 is forcibly oscillated, as represented in FIGURE 2, in counter-clockwise direction away from initially hermetically sealed closed position and the hermetic sealing sheet 13 is sheared on the circular line of notch 20, sealing ring 18 on the lower edge of movable valve member 16 will safely clear the rough and sharp sheared edge of sheet 13 as it follows the arc A of a circle concentric to the pivotal axis of said valve member.

While there have been shown and described and pointed out the fundamental novel features of this invention as applied to a single structural embodiment, it will be understood that various omissions and substitutions and changes in the form and details of the device illustrated and in its operation may be made by those skilled in the art without departing from the spirit of the invention. It is the intension, therefore, to be limited only as indicated by the scope of the following claims.

I claim:

1. A hermetically sealed butterfly valve comprising a two-part valve body including respective forward and aft sections having cylindrical inner fluid-conducting chamber sections of equal diameter arranged in near alignment and having adjacent flat inner end faces at right angles to the respective longitudinal axes of said sections, the lateral walls of the respective body sections being constricted at the adjacent ends thereof to form component half-portions of an annular valve seat, initially effective means to hermetically seal each valve body chamber section from the other in the form of a flat shearable sheet of frangible material interposed between the adjacent ends of both valve body sections, means to hold the adjacent ends of the valve body sections and interposed shearable sealing sheet tightly together in hermetically sealing relation, the surface of the shearable sealing sheet facing the forward valve body section being scored in a circular line to provide a shear-line notch arranged substantially flush with the radially inner face of the valve seat half-portion on the forward valve body section, a movable butterfly valve member in the form of a flat circular disk mounted in the aft valve body section on a transverse axis intersecting the longitudinal axis of said aft section, and an elastic non-hermetic sealing ring of continuing effectveness marginally affixed to the movable valve member for sealing contact with the valve seat half-portion on the aft valve body section in the closed condition of the valve, the longitudinal axis of the aft valve body section being slightly offset with respect to the longitudinal axis of the forward valve body section in a direction at right angles to the pivotal axis of the movable valve member and also in a direction toward the semi-circular half-portion of said valve member whose movement is confined to the aft valve body section, and the pivotal axis of the butterfly valve member being axially spaced from the valve seat, whereby the semi-circular half-portion of the sealing ring on the half-portion of the movable valve member which moves past the composite valve seat during opening of the valve will clear the broken edge of the body-attached marginal portion of the sheared hermetic sealing sheet and not be damaged thereby.

2. A hermetically sealed butterfly valve as defined in claim 1, wherein the notch in the shearable hermetic sealing sheet is V-shaped in radial cross-section and arranged with its outer side wall at right angles to the plane of the sheet face and precisely flush with the radially inner face of the valve seat half-portion on the forward valve body section.

3. A hermetically sealed butterfly valve as defined in claim 1, wherein the shearable sealing sheet is securely affixed to the movable valve member for movement therewith following shearing action.

References Cited in the file of this patent

UNITED STATES PATENTS

| | | |
|---|---|---|
| 1,796,200 | Grieshaber | Mar. 10, 1931 |
| 2,169,123 | Galusha | Aug. 8, 1939 |
| 2,905,358 | Herbage | Sept. 22, 1959 |
| 2,980,388 | White | Apr. 18, 1961 |